United States Patent
Lee et al.

(10) Patent No.: US 9,602,263 B2
(45) Date of Patent: Mar. 21, 2017

(54) ACK/NACK TRANSMISSION METHOD IN WIRELESS ACCESS SYSTEM AND APPARATUS THEREFOR

(71) Applicant: LG Electronics Inc., Seoul (KR)

(72) Inventors: Jihyun Lee, Anyang-si (KR);
Hakseong Kim, Anyang-si (KR);
Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 50 days.

(21) Appl. No.: 14/383,067

(22) PCT Filed: Mar. 26, 2013

(86) PCT No.: PCT/KR2013/002490
§ 371 (c)(1),
(2) Date: Sep. 4, 2014

(87) PCT Pub. No.: WO2013/151263
PCT Pub. Date: Oct. 10, 2013

(65) Prior Publication Data
US 2014/0376489 A1    Dec. 25, 2014

Related U.S. Application Data

(60) Provisional application No. 61/619,400, filed on Apr. 2, 2012.

(51) Int. Cl.
*H04L 5/00* (2006.01)
*H04W 72/04* (2009.01)
(Continued)

(52) U.S. Cl.
CPC .......... *H04L 5/0055* (2013.01); *H04L 1/1607* (2013.01); *H04W 72/0446* (2013.01); *H04L 2001/0092* (2013.01)

(58) Field of Classification Search
CPC ................ H04L 5/0055; H04L 1/1607; H04L 2001/0092; H04W 72/0446
See application file for complete search history.

(56) References Cited

U.S. PATENT DOCUMENTS 8,472,357 B2 * 6/2013 Ali .................... H04B 7/15521
370/280
2006/0109814 A1 * 5/2006 Kuzminskiy ........ H04B 7/0408
370/329
(Continued)

FOREIGN PATENT DOCUMENTS

EP    2204937 A1    7/2010
WO    11062459 A2    5/2011
(Continued)

OTHER PUBLICATIONS

International Search Report from PCT/KR2013/002490, dated Jul. 16, 2013.
(Continued)

*Primary Examiner* — Gbemileke J Onamuti
(74) *Attorney, Agent, or Firm* — Dentons US LLP

(57) ABSTRACT

An ACK/NACK (acknowledgement/negative-ACK) transmission method in a wireless access system that supports device-to-device communication and an apparatus therefor are disclosed. Specifically, a method for transmitting ACK/NACK in a wireless access system that supports the device-to-device communication comprises the steps of: receiving first data in a first sub-frame, receiving second data from a base station in a second subframe, and when data transmission and reception through the device-to-device communication carried out in a third sub-frame for transmitting the ACK/NACK information on the first data, transmitting, to the base station in a fourth sub-frame, a grouped ACK/NACK information including the ACK/NACK information (Continued)

on the first data and the ACK/NACK information on the second data.

18 Claims, 12 Drawing Sheets

(51) Int. Cl.
*H04L 1/16* (2006.01)
*H04L 1/00* (2006.01)

(56) References Cited

U.S. PATENT DOCUMENTS

| | | | | |
|---|---|---|---|---|
| 2011/0188447 A1* | 8/2011 | Wang | ................... | H04L 5/0053 370/328 |
| 2011/0268004 A1 | 11/2011 | Doppler et al. | | |
| 2012/0113876 A1* | 5/2012 | Li | ................... | H04L 1/1861 370/280 |
| 2012/0134305 A1* | 5/2012 | Damnjanovic | ....... | H04L 1/1607 370/280 |
| 2013/0225184 A1* | 8/2013 | Liu | ................... | H04W 72/042 455/450 |
| 2015/0016432 A1* | 1/2015 | Meyer | ................... | H04L 1/1854 370/336 |

FOREIGN PATENT DOCUMENTS

| | | |
|---|---|---|
| WO | 12019348 A1 | 2/2012 |
| WO | 12036514 A1 | 3/2012 |

OTHER PUBLICATIONS

Written Opinion of the ISA from PCT/KR2013/002490, dated Jul. 16, 2013.

* cited by examiner

ACK/NACK TRANSMISSION METHOD IN WIRELESS ACCESS SYSTEM AND APPARATUS THEREFOR

This Application is a 35 U.S.C. §371 National Stage entry of International Application No. PCT/KR2013/002490 filed Mar. 26, 2013, which claims benefit of Provisional Application No. 61/619,400 filed Apr. 2, 2012, of which are incorporated by reference in their entirety herein.

TECHNICAL FIELD

The present invention relates to a wireless access system, and more particularly, to a method for transmitting ACK/NACK (acknowledgement/negative-ACK) signal in a wireless access system that supports device-to-device communication and an apparatus therefor.

BACKGROUND ART

In cellular communication, a user equipment existing within a cell transmits and receives data to and from a base station after receiving control information for transmitting and receiving to and from the base station by accessing the base station to perform communication. In other words, since the user equipment transmits and receives data through the base station, the user equipment transmits its data to the base station to transmit data to another cellular user equipment and the base station that has received the data of the user equipment transmits the received data to another user equipment. In this way, in order that the user equipment transmits data to another user equipment, since the user equipment may transmit the data through the base station, the base station performs scheduling for channel and resource for data transmission and reception and transmits channel resource scheduling information to each user equipment. In this way, for communication between the user equipments through the base station, although each user equipment requires channel and resource allocation for data transmission and reception from the base station, device-to-device communication has a structure that a user equipment directly transmits and receives a signal to and from another user equipment without through a base station or a relay.

However, if device-to-device communication where data are directly transmitted and received between the user equipments is performed through sharing a resource with the existing cellular network, collision may occur between hybrid automatic repeat and request (HARQ) timing based on cellular communication and data based on device-to-device communication.

DISCLOSURE

Technical Problem

An object of the present invention is to provide a method for desirably performing HARQ operation for communication between a user equipment and a base station and device-to-device communication in a wireless access system that supports device-to-device communication and an apparatus therefor.

Another object of the present invention is to provide a method for transmitting group ACK/NACK feedback for reception of two or more data in a wireless access system that supports device-to-device communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, provided herein is a method for transmitting an ACK/NACK (acknowledgement/negative-ACK) signal in a wireless access system supporting a device-to-device communication, the method comprising receiving first data at a first subframe; receiving second data from a base station at a second subframe; and when data transmission and reception according to the device-to-device communication are performed at a third subframe for transmitting ACK/NACK information for the first data, transmitting, to the base station at a fourth subframe, group ACK/NACK information including the ACK/NACK information for the first data and ACK/NACK information for the second data.

In another aspect of the present invention, provided herein is a user equipment for transmitting an ACK/NACK (acknowledgement/negative-ACK) signal in a wireless access system supporting a device-to-device communication, the user equipment comprising a radio frequency (RF) unit configured to transmit and receive a radio signal; and a processor, wherein the processor is configured to receive first data at a first subframe, receive second data from a base station at a second subframe, and when data transmission and reception according to the device-to-device communication are performed at a third subframe for transmitting ACK/NACK information for the first data, transmit, to the base station at a fourth subframe, group ACK/NACK information including the ACK/NACK information for the first data and ACK/NACK information for the second data.

Preferably, the first data may be transmitted either from another user equipment which performs the device-to-device communication or from the base station.

Preferably, the group ACK/NACK may be transmitted by bundling of the ACK/NACK information for the first data and the ACK/NACK information for the second data.

Preferably, a resource in which the ACK/NACK information for the first data is transmitted may be determined by PUCCH (Physical Uplink Control Channel) resource index linked to scheduling information of the first data, and a resource in which the ACK/NACK information for the second data is transmitted may be determined by PUCCH resource index linked to scheduling information of the second data.

Preferably, the ACK/NACK information for the first data and the ACK/NACK information for the second data may be encoded together and then transmitted through a single PUCCH.

Preferably, a resource in which the ACK/NACK information for the first data is transmitted and a resource in which the ACK/NACK information for the second data is transmitted may be allocated exclusively.

Preferably, a resource in which the group ACK/NACK is transmitted may be determined by PUCCH resource index linked to scheduling information of the second data.

Preferably, the second subframe may be a downlink subframe which firstly comes after the first subframe.

Advantageous Effects

According to the embodiment of the present invention, HARQ operation for communication between a user equipment and a base station and device-to-device communication may be performed desirably in a wireless access system that supports device-to-device communication.

Also, according to the embodiment of the present invention, group ACK/NACK feedback for reception of two or more data may be transmitted, whereby data collision, which is caused by communication between the user equipment and the base station and device-to-device communication, may be avoided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
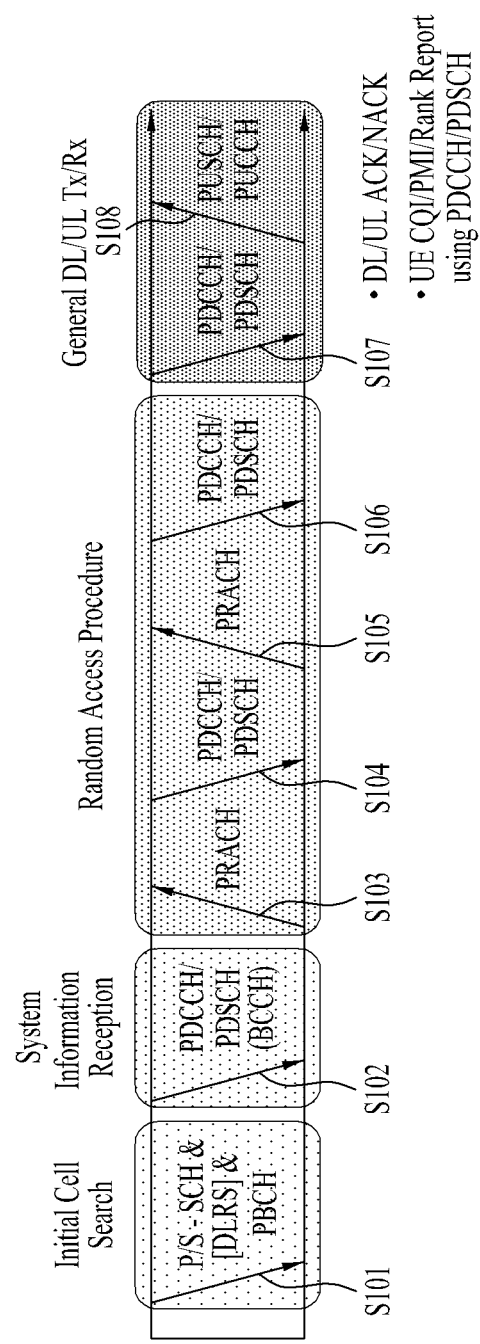
FIG. 1 is a diagram illustrating physical channels used in a 3GPP LTE system and a general method for transmitting a signal using the physical channels.

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus.

In this specification, the embodiments of the present invention have been described based on the data transmission and reception between a base station and a user equipment. In this case, the base station means a terminal node of a network, which performs direct communication with the user equipment. Herein, a specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. At this time, the base station (BS) may be replaced with terms such as a fixed station, Node B, eNode B (eNB), and an access point (AP). A relay may be replaced with terms such as relay node (RN) and relay station (RS). Also, terminal may be replaced with terms such as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, and a device-to-device (D2D) device.

Specific terminologies used in the following description are provided to assist understanding of the present invention, and various modifications may be made in the specific terminologies within the range that they do not depart from technical spirits of the present invention.

The embodiments of the present invention may be supported by standard documents disclosed in at least one of wireless access systems, i.e., IEEE 802.xx system, 3GPP system, 3GPP LTE system, and 3GPP2 system. Namely, among the embodiments of the present invention, steps or parts which are not described to clarify the technical spirits of the present invention may be supported by the above standard documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A.

3GPP LTE/LTE-A System to which the Present Invention May be Applied

FIG. 1 is a diagram illustrating physical channels used in a 3GPP LTE system and a general method for transmitting a signal using the physical channels.

The user equipment, of which power is turned on, or which newly enters a cell, performs initial cell search such as synchronizing with the base station at step S101. To this end, the user equipment synchronizes with the base station by receiving a primary synchronization channel (P-SCH) and a secondary synchronization channel (S-SCH) from the base station, and acquires information such as cell ID, etc.

Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink control channel (PDCCH) and a physical downlink shared channel (PDSCH) based on the PDCCH at step S102.

Afterwards, the user equipment may perform a random access procedure (RACH) such as steps S103 to S106 to complete access to the base station. To this end, the user equipment may transmit a preamble through a physical random access channel (PRACH) (S103), and may receive a response message to the preamble through the PDCCH and the PDSCH corresponding to the PDCCH (S104). In case of a contention based RACH, the user equipment may perform a contention resolution procedure such as transmission (S105) of additional physical random access channel and reception (S106) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S107) and transmit a physical uplink shared channel (PUSCH) and a physical uplink control channel (PUCCH) (S108), as a general procedure of transmitting uplink/downlink signals.

Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CQI (channel quality indicator), PMI (precoding matrix indicator), RI (rank indication) information, etc.

Although the UCI is generally transmitted through the PUCCH in the LTE system, it may be transmitted through the PUSCH if control information and traffic data should be transmitted at the same time. Also, the user equipment may non-periodically transmit the UCI through the PUSCH in accordance with request/command of the network.

Figure 2:
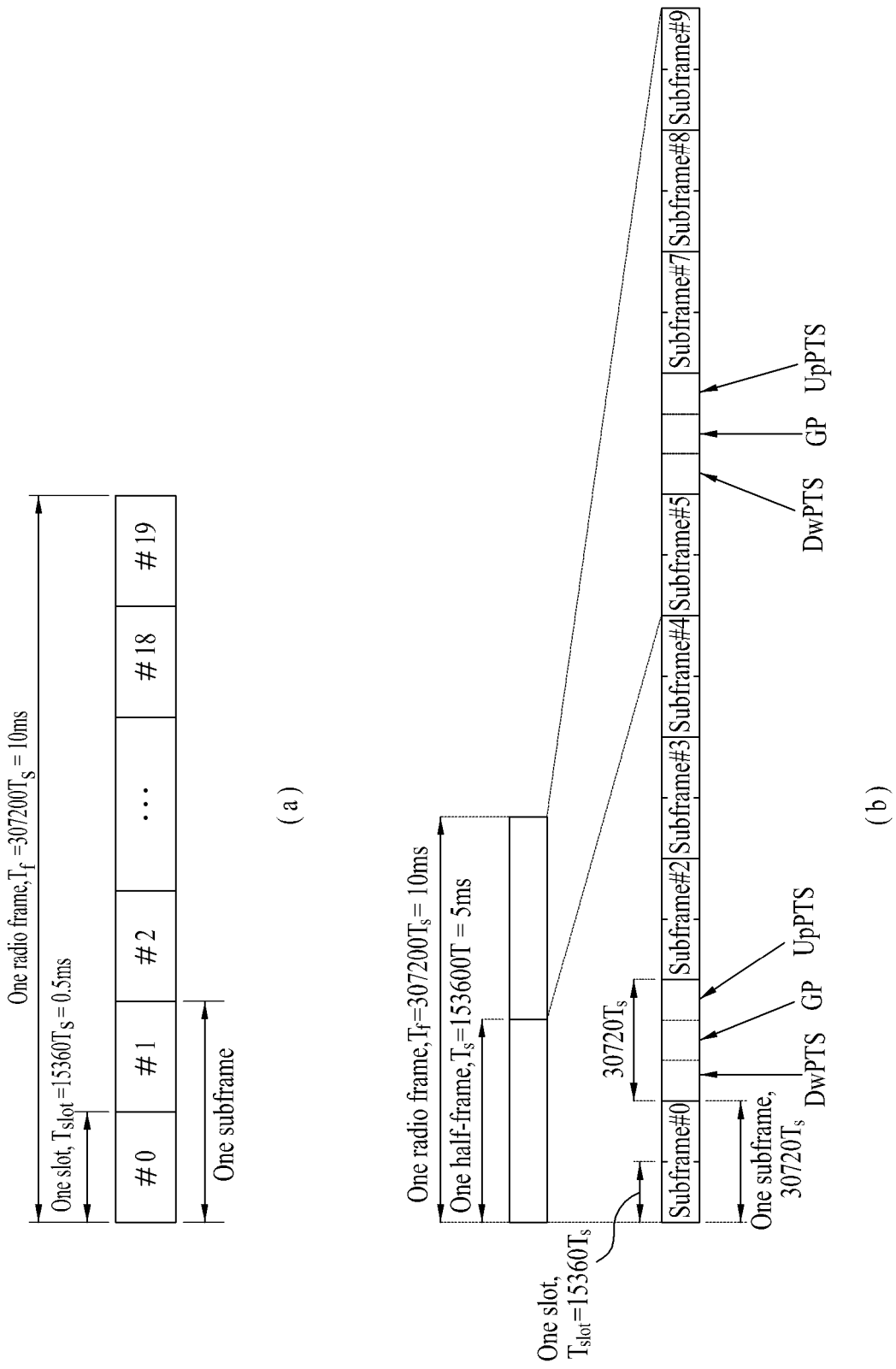
FIG. 2 is a diagram illustrating a structure of a radio frame used in a 3GPP LTE system.

FIG. 2 is a diagram illustrating a structure of a radio frame in a 3GPP LTE.

In a cellular OFDM wireless packet communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 2(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols is intended to express one symbol interval. The OFDM symbols may be referred to as one SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of the subframe may be allocated to a physical downlink control channel (PDCCH), and the other OFDM symbols may be allocated to a physical downlink shared channel (PDSCH).

FIG. 2(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One of the five subframes includes two slots. The DwPTS is used for initial cell search, synchronization or channel estimation at the user equipment. The UpPTS is used to synchronize channel estimation at the base station with uplink transmission of the user equipment. Also, the guard period is to remove interference occurring in the uplink due to multipath delay of downlink signals between the uplink and the downlink.

The aforementioned structure of the radio frame is only exemplary, and various modifications may be made in the number of subframes included in the radio frame or the number of slots included in the subframe, or the number of symbols included in the slot.

Figure 3:
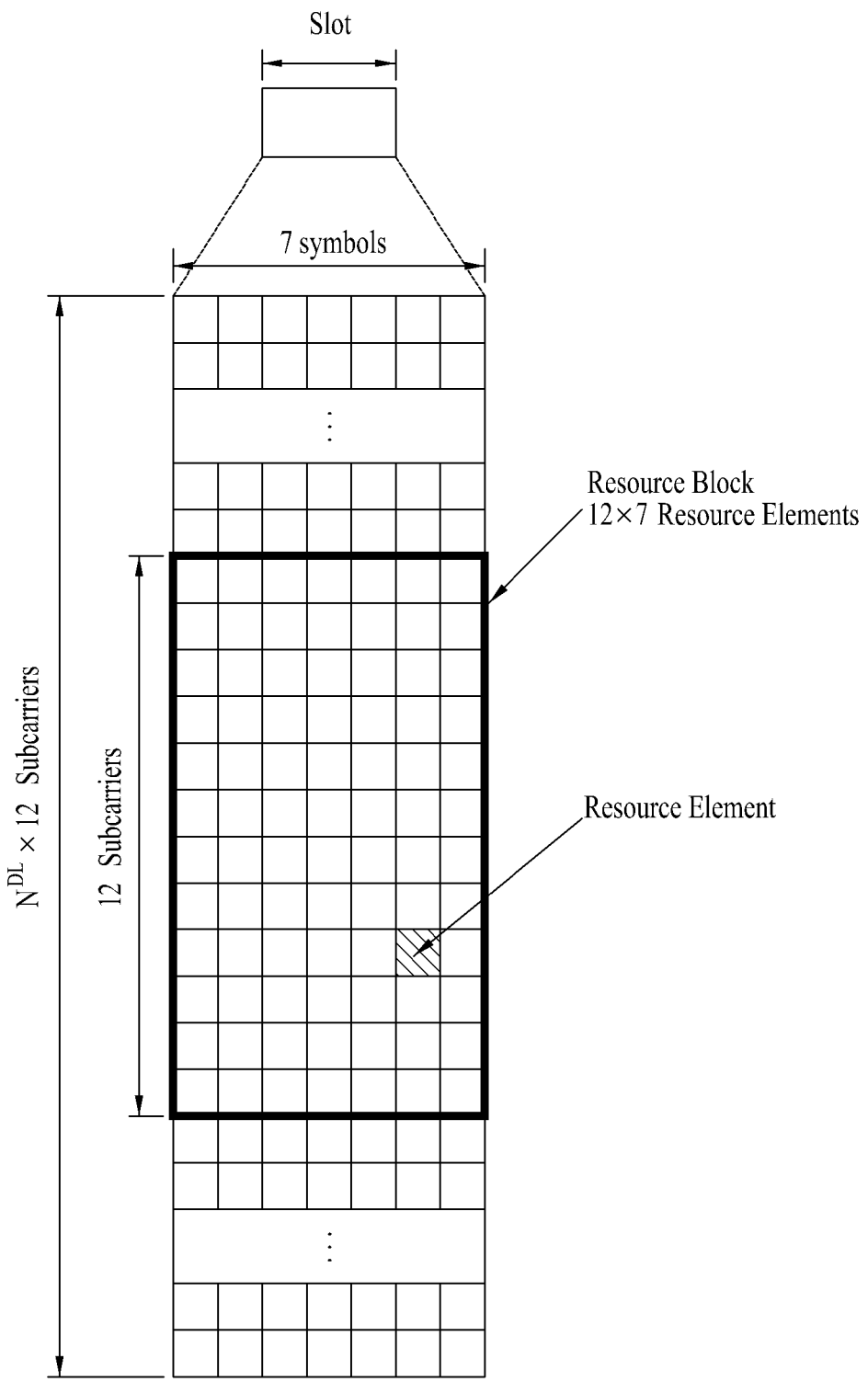
FIG. 3 is a diagram illustrating an example of a resource grid of one downlink slot.

FIG. 3 is a diagram illustrating a resource grid for a downlink slot used in an LTE system.

Referring to FIG. 3, one downlink slot includes a plurality of OFDM symbols in a time domain. In this case, one downlink slot includes, but not limited to, seven OFDM symbols, and one resource block (RB) includes, but not limited to, twelve subcarriers in a frequency domain.

Each element on the resource grid will be referred to as a resource element (RE). One resource block (RB) includes 12×7(6) resource elements. The number $N_{DL}$ of resource blocks (RBs) included in the downlink slot depends on a downlink transmission bandwidth. A structure of an uplink slot may be the same as that of the downlink slot.

Figure 4:
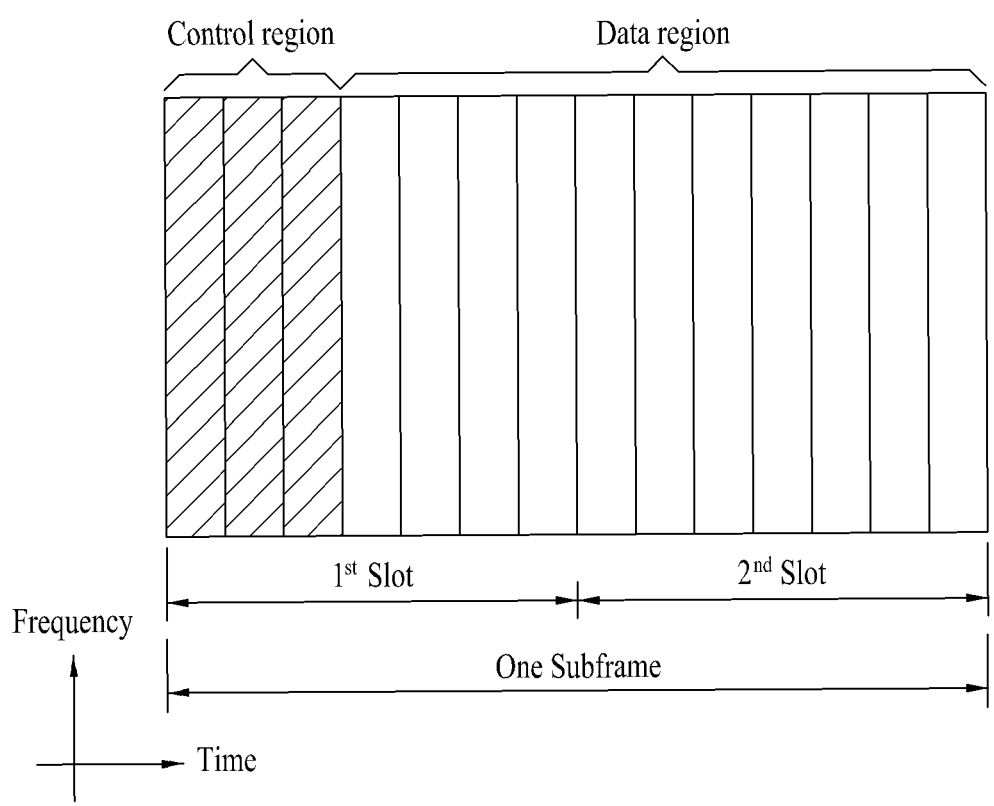
FIG. 4 is a diagram illustrating a structure of a downlink subframe.

FIG. 4 is a diagram illustrating a structure of a downlink subframe.

Referring to FIG. 4, maximum three (four) OFDM symbols located at the front of the first slot within one subframe correspond to a control region to which control channels are allocated. The other OFDM symbols correspond to a data region to which a physical downlink shared channel (PDSCH) is allocated. Examples of the downlink control channel used in the 3GPP LTE include a PCFICH (Physical Control Format Indicator CHannel), a PDCCH (Physical Downlink Control CHannel), and a PHICH (Physical Hybrid ARQ Indicator CHannel).

The PCFICH is transmitted from the first OFDM symbol of the subframe, and carries information on the number (that is, size of the control region) of OFDM symbols used for transmission of the control channels within the subframe. The PHICH is a response channel to uplink transmission, and carries HARQ ACK/NACK (acknowledgement/negative-acknowledgement) signal. The control information transmitted through the PDCCH will be referred to as downlink control information (DCI). The downlink control information (DCI) includes uplink resource allocation information, downlink resource allocation information, or uplink transmission (Tx) power control command for a random user equipment group.

The PDCCH may carry resource allocation and transport format (that may be referred to as downlink grant) of a downlink shared channel (DL-SCH), resource allocation information (that may be referred to as uplink grant) of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, and activity indication information of voice over Internet protocol (VoIP). A plurality of PDCCHs may be transmitted within the control region, and the user equipment may monitor the plurality of PDCCHs. The PDCCH is configured by aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCEs.

The base station determines a PDCCH format depending on the DCI which will be transmitted to the user equipment, and attaches cyclic redundancy check (CRC) to the control information. The CRC is masked with a unique identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indication identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI) to indicate a random access response which is a response to transmission of a random access preamble.

Figure 5:
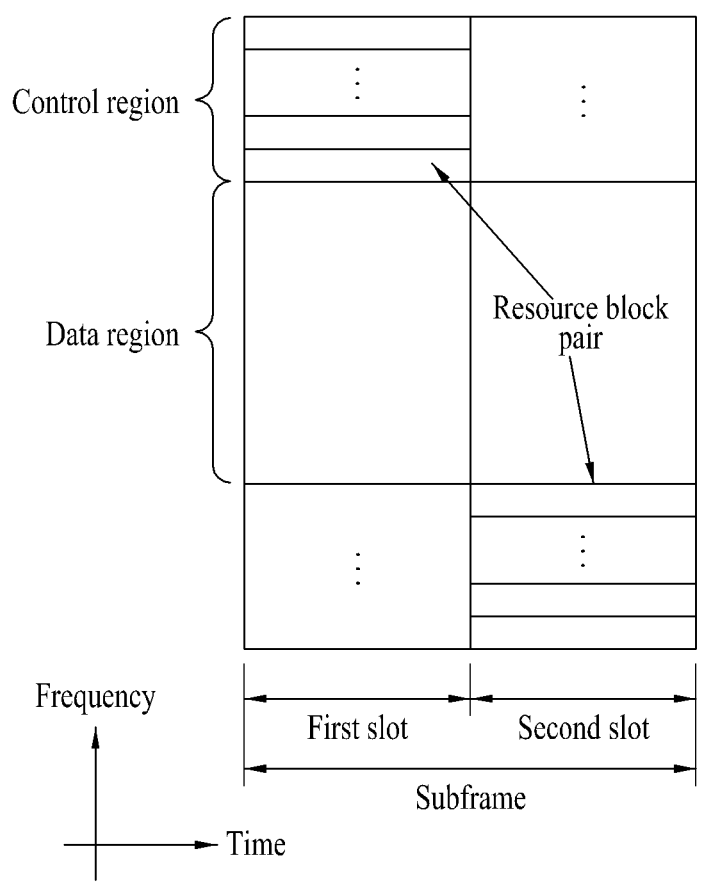
FIG. 5 is a diagram illustrating a structure of an uplink subframe.

FIG. 5 is a diagram illustrating a structure of an uplink subframe.

Referring to FIG. 5, the uplink subframe may be divided into a control region and a data region in a frequency domain. A physical uplink control channel (PUCCH) which carries uplink control information is allocated to the control region. A physical uplink shared channel (PUSCH) which carries user data is allocated to the data region. In order to maintain single carrier features, one user equipment does not transmit the PUCCH and the PUSCH at the same time. A resource block (RB) pair for the subframe is allocated to the PUCCH for one user equipment. Resource blocks (RBs) belonging to the RB pair reserve their respective subcarriers different from each other at each of two slots. The RB pair allocated to the PUCCH is subjected to frequency hopping at a slot boundary.

MIMO (Multi-Input Multi-Output) System

Figure 6:
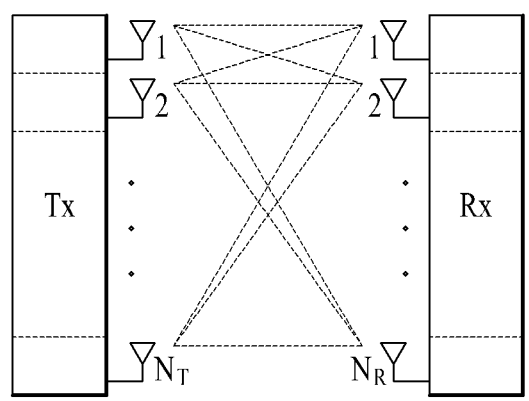
FIGS. 6 and 7 are schematic diagrams illustrating a wireless communication system having multiple antennas.
Figure 7:
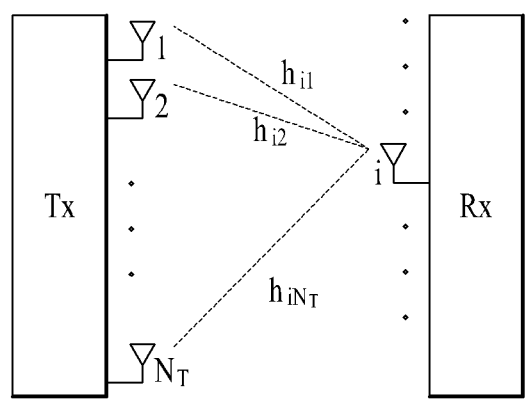

FIGS. 6 and 7 are schematic diagrams illustrating a wireless communication system having multiple antennas.

As shown in FIG. 6, if the number of transmitting antennas is increased to $N_T$ and the number of receiving antennas is increased to $N_R$, channel transmission capacity is increased theoretically in proportion to the number of antennas unlike that a plurality of antennas are used in only a transmitter or a receiver. Accordingly, it is possible to improve a transmission rate and remarkably improve frequency efficiency. A transmission rate based on increase of channel transmission capacity may be increased theoretically as much as a value obtained by multiplying a maximum transmission rate $R_0$, which corresponds to a case where a single antenna is used, by an increase rate $R_i$ as follows.

$$R_i = \min(N_T, N_R) \quad \text{[Equation 1]}$$

For example, in a MIMO communication system that uses four transmitting antennas and four receiving antennas, a transmission rate theoretically four times greater than that of a single antenna system may be obtained. After theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and modeling of a MIMO system, and the study of time space signal processing technology for improvement of transmission reliability and transmission rate.

A communication method in a MIMO system will be described in more detail with reference to mathematical modeling. In the MIMO system, it is assumed that $N_T$ transmitting antennas and $N_R$ receiving antennas exist.

First of all, a transmitting signal will be described. If $N_T$ transmitting antennas exist, the number of maximum transmission information is $N_T$. The transmission information may be expressed as follows.

$$s = [s_1, s_2, \ldots, s_{N_T}]^T \quad \text{[Equation 2]}$$

Different kinds of transmission power may be applied to each of the transmission information $s_1, s_2, \ldots, s_{N_T}$. At this time, supposing that each transmission power is $P_1$, $P_2, \ldots, P_{N_T}$, transmission information of which transmission power is controlled may be expressed as follows.

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{[Equation 3]}$$

Also, $\hat{s}$ may be expressed as follows using a diagonal matrix P.

$$\hat{s}=\begin{bmatrix} P_1 & & & 0 \\ & P_2 & & \\ & & \ddots & \\ 0 & & & P_{N_T} \end{bmatrix}\begin{bmatrix} s_1 \\ s_2 \\ \vdots \\ s_{N_T} \end{bmatrix}=Ps \quad \text{[Equation 4]}$$

It is considered that a weight matrix W is applied to the information vector $\hat{s}$ of which transmission power is controlled, so as to obtain $N_T$ transmitting signals $x_1, x_2, \ldots, x_{N_T}$. In this case, the weight matrix W serves to properly distribute the transmission information to each antenna depending on the transmission channel status. Such transmitting signals $x_1, x_2, \ldots, x_{N_T}$ may be expressed as follows using a vector X.

$$x=\begin{bmatrix} x_1 \\ x_2 \\ \vdots \\ x_i \\ \vdots \\ x_{N_T} \end{bmatrix}=\begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix}\begin{bmatrix} \hat{s}_1 \\ \hat{s}_2 \\ \vdots \\ \hat{s}_j \\ \vdots \\ \hat{s}_{N_T} \end{bmatrix}=W\hat{s}=WPs \quad \text{[Equation 5]}$$

In this case, $W_{ij}$ means a weight value between the ith transmitting antenna and the jth information. W may be referred to as a precoding matrix.

If there exist $N_R$ receiving antennas, receiving signals $y_1, y_2, \ldots y_{N_R}$ of the respective antennas may be expressed by a vector as follows.

$$y=[y_1,y_2,\ldots,y_{N_R}]^T \quad \text{[Equation 6]}$$

In case of channel modeling in the MIMO communication system, channels may be classified depending on indexes of transmitting and receiving antennas. In this case, a channel that passes from the jth transmitting antenna to the ith receiving antenna will be expressed as $h_{ij}$. It is noted that index of the receiving antenna is prior to index of the transmitting antenna in index of $h_{ij}$.

Meanwhile, FIG. 7 is a diagram illustrating channels from $N_T$ transmitting antennas from the receiving antenna i. Several channels may be grouped into one and then may be expressed by a vector type and a matrix type. In FIG. 7, the channels from $N_T$ transmitting antennas to the ith receiving antenna may be expressed as follows.

$$h_i^T=[h_{i1},h_{i2},\ldots,h_{iN_T}] \quad \text{[Equation 7]}$$

Accordingly, all channels from $N_T$ transmitting antennas to $N_R$ receiving antennas may be expressed as follows.

$$H=\begin{bmatrix} h_1^T \\ h_2^T \\ \vdots \\ h_i^T \\ \vdots \\ h_{M_R}^T \end{bmatrix}=\begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Additive white Gaussian noise (AWGN) is actually added to the channels after passing through the above channel matrix H. AWGN $n_1, n_2, \ldots, n_{N_R}$ added to each of the $N_R$ receiving antennas may be expressed as follows.

$$n=[n_1,n_2,\ldots,n_{N_R}]^T \quad \text{[Equation 9]}$$

The receiving signals obtained using the above equation modeling may be expressed as follows.

$$y=\begin{bmatrix} y_1 \\ y_2 \\ \vdots \\ y_i \\ \vdots \\ y_{N_R} \end{bmatrix}=\begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}\begin{bmatrix} x_1 \\ x_2 \\ \vdots \\ x_j \\ \vdots \\ x_{N_T} \end{bmatrix}+\begin{bmatrix} n_1 \\ n_2 \\ \vdots \\ n_i \\ \vdots \\ n_{N_R} \end{bmatrix}=Hx+n \quad \text{[Equation 10]}$$

In the meantime, the number of rows and columns of the channel matrix H indicating the channel state is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H may be expressed by $N_R \times N_T$ matrix.

A rank of the matrix is defined by a minimum number of the number of rows and the number of columns, which are independent from each other. Therefore, the rank of the matrix cannot have a value greater than the number of rows or the number of columns. Rank (rank(H)) of the channel matrix H may be limited as follows.

$$\text{rank}(H) \leq \min(N_T, N_R) \quad \text{[Equation 11]}$$

The rank may also be defined by the number of eigen values not 0 when eigen value decomposition is performed for the matrix. Similarly, the rank may be defined by the number of singular values not 0 when singular value decomposition (SVD) is performed for the matrix. Accordingly, in the channel matrix, the rank may physically mean a maximum number of columns or rows that may transmit different kinds of information from a given channel.

Improved Method For Transmitting ACK/NACK In A Wireless Access System That Supports Direct Communication Between User Equipments Direct communication between user equipments means a method for transmitting and receiving data and/or control information through direct communication between user equipments without a base station in a state that a channel status between two or more user equipments is good or the user equipments are located to adjoin each other. The greatest purpose of direct communication between user equipments is to save the power and radio resources, as compared with communication between the user equipments through a base station, through direct communication between the user equipments by connecting a direct link between the user equipments located at a short distance from each other or between the user equipments having good channel statuses. At this time, although data of each user equipment are exchanged through direct communication, direct communication between user equipments associated with the present invention is different from Bluetooth communication, infrared communication, etc. in that predetermined control information for direct communication between the user equipments is provided by the base station, wherein data are exchanged between the user equipments without intervention of the base station in Bluetooth communication, infrared communication, etc.

Such direct communication between the user equipments may be used to refer to device-to-device (D2D) communication, machine-to-machine (M2M) communication, machine-type communication (MTC), UE-to-UE communication, or peer-to-peer (P2P) communication. Hereinafter, for convenience of description, direct communication between the user equipments will be referred to as 'device-to-device (D2D) communication' to describe the embodiments of the present invention. Also, in the present invention, all the nodes except for the D2D device will be referred to as base stations. For example, a relay node, an antenna node of a distributed antenna system (DAS), or the like may be referred to as a base station in view of an access point for accessing the base station.

Figure 8:
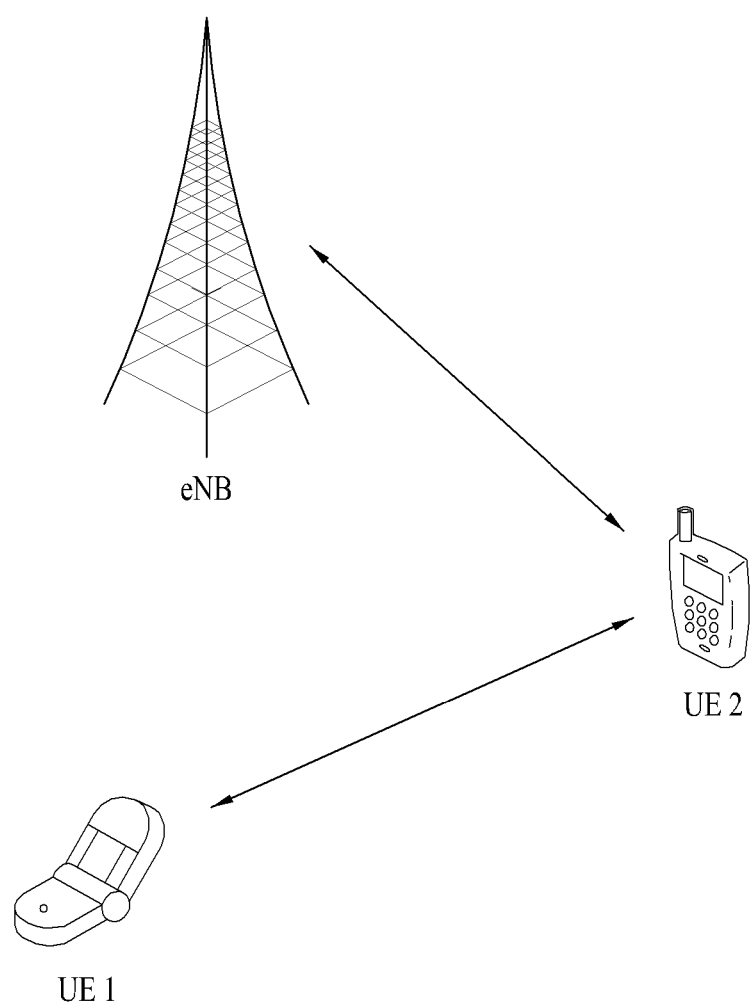
FIG. 8 is a diagram illustrating a cellular system that supports UE-to-UE communication.

FIG. 8 is a diagram illustrating a cellular system that supports UE-to-UE communication.

Referring to FIG. 8, in a cellular system that supports UE-to-UE communication, a user equipment 2 (UE 2) performs direct communication with a user equipment 1 (UE 1), and may perform communication with a base station. If a resource used for direct communication between the user equipments is scheduled within an uplink resource between the base station and the user equipment, direct communication between the user equipments may be represented as a new type of uplink interference in view of the base station. Accordingly, it is preferable that the base station has a function of directly controlling UE-to-UE communication to protect signal of other user equipments from interference occurring due to UE-to-UE communication. For example, the base station may schedule signal transmission based on UE-to-UE communication simultaneously with scheduling user equipments located within cell coverage, and may perform power control.

The present invention suggests a method for transmitting success or not (A/N information) of data reception in a cellular system where UE-to-UE communication is scheduled as shown in FIG. 8.

In order that such operation of the base station may be performed preferably, the user equipment may transmit necessary information (for example, ACK/NACK indicating success or not of signal reception in UE-to-UE communication, hereinafter, referred to as A/N signal) to the base station.

Hereinafter, for convenience of description, it is assumed that UE-to-UE communication and UE-to-eNB communication respectively occur at different times. This means that a signal is transmitted from a specific user equipment to another user equipment at a time different from the time when a signal is transmitted from the corresponding specific user equipment to the base station. Also, although the operation according to the present invention is described based on UE-to-UE communication, it may equally be applied to even a case where the base station performs communication with the user equipment connected thereto, in the form of the user equipment (for example, in the form of transmission performed using uplink transmission resource used, by the user equipments, for UE-to-UE transmission). Also, in the embodiment of the present invention, although it is assumed that the resource used for UE-to-UE communication is scheduled within the uplink resource between the base station and the user equipment, the resource used for UE-to-UE communication is not limited to this assumption. In other words, the resource used for UE-to-UE communication may be allocated within the uplink resource between the base station and the user equipment, or may be allocated within the downlink resource between the base station and the user equipment.

The 3GPP LTE system uses synchronous HARQ for uplink HARQ. The synchronous HARQ system means the system that the location where transmission/retransmission of the HARQ process occurs is previously designated and is not changed. This will be described with reference to FIG. 9.

Figure 9:
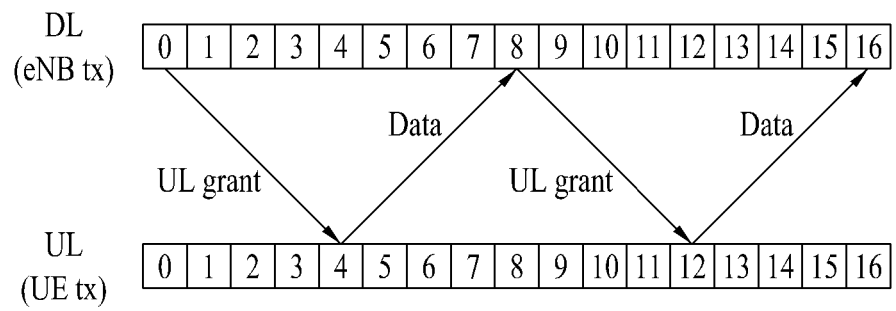
FIG. 9 is a diagram illustrating an uplink HARQ operation in an FDD system.

FIG. 9 is a diagram illustrating an uplink HARQ operation in an FDD system.

Referring to FIG. 9, the base station schedules PUSCH transmission of the user equipment by transmitting uplink (UL) grant (or uplink resource allocation information) through PDCCH at a downlink subframe 0. In accordance with uplink scheduling information, the use requpment transmits data to the base station through the PUSCH at an uplink subframe 4. If the base station receives the data from the user equipment through the PUSCH, the base station stores the received data in a soft buffer and then tries decoding of the data. Subsequently, the base station schedules PUSCH transmission of the user equipment by transmitting uplink (UL) grant for retransmission (that is, decoding is failed) of the corresponding signal or new transmission (that is, decoding is successfully performed) at the corresponding HARQ process through the PDCCH.

If HARQ NACK signal is received from the base station, the user equipment may perform retransmission of the same data at a time designated in accordance with the same format or new format. On the other hand, if ACK signal is received from the base station, the user equipment senses that data transmission to the base station has been successfully performed, and the user equipment stops HARQ retransmission of the corresponding data. Afterwards, if the retransmitted data is received, the base station again tries decoding by combining the received retransmitted data with the data of which decoding is failed and then stored in the soft buffer in various manners. If decoding is successfully performed, the base station transmits ACK signal, and if decoding is failed, the base station transmits NACK signal and repeats the retransmission procedure. Accordingly, a signal retransmission cycle between the user equipment and the base station in the FDD system is 8 ms (that is, initial transmission at subframe 4, retransmission at subframe 12, . . . ).

Such HARQ scheme of the user equipment may be referred to as a non-adaptive HARQ scheme. In other words, although initial transmission of specific data may be performed only if PDCCH, which includes uplink scheduling information, should be received, retransmission may be performed even if the PDCCH is not received. According to this non-adaptive HARQ retransmission, retransmission of the corresponding data is performed using the same UL scheduling information as that of the initial transmission at TTI (after the fourth subframe in the FDD system) at which next HARQ process is allocated, even though the PDDCH is not received. In other words, if the user equipment receives NACK signal through PHICH, the user equipment performs HARQ retransmission operation non-adaptively.

Also, HARQ retransmission of the user equipment may be operated adaptively. In this case, the transmission parameters for retransmission are received through the PDCCH. Scheduling information included in the corresponding PDCCH may be different from that of initial transmission depending on channel status. For example, if the channel status is better than that of initial transmission, data transmission of a high bit rate may be indicated. On the other hand, if the channel status is not better than that of initial transmission, data transmission of a low bit rate may be indicated.

If the user equipment receives UL scheduling information, the user equipment may identify whether data to be transmitted corresponds to initial transmission or retransmission of previous data, through a new data indicator (NDI) field included in the PDCCH. The NDI field is toggled in the order of 0->1->0->1->0 . . . whenever new data is transmitted. In case of retransmission, the NDI field has the same value as that of initial transmission. In other words, the user equipment does not end HARQ operation if ACK signal is received through the PHICH, and may compare a value of the NDI field included in the PDCCH with a previously transmitted value to identify whether data retransmission is performed. In other words, actual control as to whether data retransmission should be performed is made through the NDI included in uplink scheduling grant transmitted to the PDCCH.

In order to support both the adaptive HARQ scheme and the non-adaptive HARQ scheme, related PHICH and PDCCH may be transmitted at the uplink subframe at the same timing. However, according to the non-adaptive HARQ operation as described above, the PDCCH for transmitting uplink grant for retransmission is not required, and the PHICH of 1 bit for retransmission may only be used. However, for convenience of description, it is assumed that indication information as to whether retransmission is performed is transmitted by being included in uplink grant.

As described above, if the base station schedules signal transmission based on UE-to-UE communication, an operation different from the existing HARQ operation will be required. The HARQ operation will be described in accordance with time sequence. First of all, the base station schedules signal transmission for UE-to-UE communication by transmitting uplink (UL) grant for UE-to-UE communication to the transmitting user equipment. If the transmitting user equipment transmits a signal to the user equipment of the other party (that is, receiving user equipment) at next timing point in accordance with the uplink scheduling information for UE-to-UE communication, the receiving user equipment may report success or failure (that is, success or failure in decoding of received data) in reception of the signal transmitted from the transmitting user equipment to the base station through A/N. In other words, the receiving user equipment may transmit ACK signal to the base station if data decoding is successfully performed, and may transmit NACK signal to the base station if data decoding is failed. These timing points may be determined previously in synchronous HARQ status, and the base station schedules the transmitting user equipment to perform retransmission of the corresponding signal, if necessary (for example, if NACK signal is received by the base station signal from the receiving user equipment), on the basis of such signal exchange. As described with reference to the aforementioned 3GPP LTE/LTE-A FDD system, if a time interval of 4 m is required between scheduling message of the base station and signal transmission of the user equipment, between signal reception of the user equipment and A/N signal transmission, and between A/N signal reception of the base station and retransmission scheduling, HARQ operation of FIG. 10 may be performed as follows.

Figure 10:
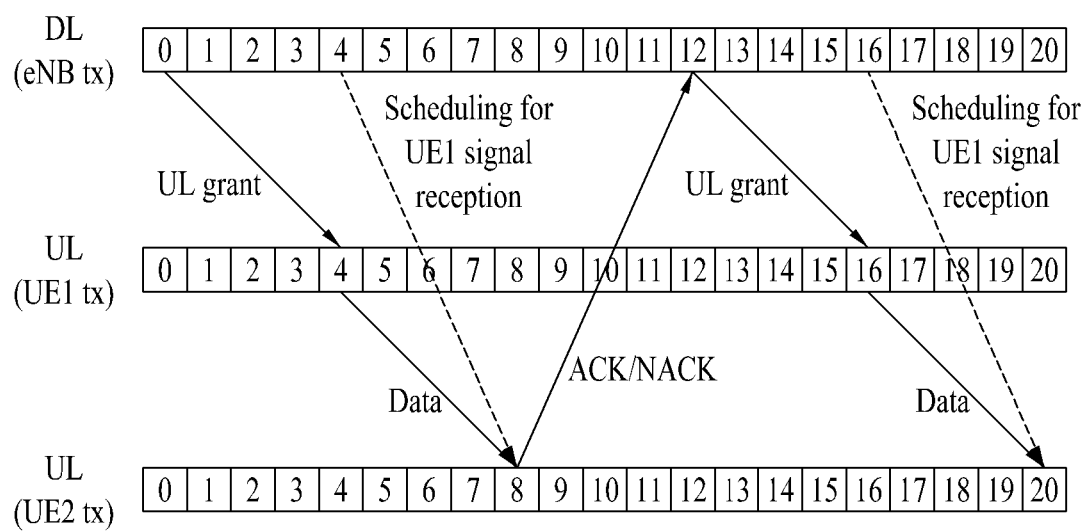
FIG. 10 is a diagram illustrating HARQ operation for UE-to-UE communication in a cellular system that supports UE-to-UE communication.

FIG. 10 is a diagram illustrating HARQ operation for UE-to-UE communication in a cellular system that supports UE-to-UE communication.

Referring to FIG. 10, if the base station performs scheduling (UL grant) for a user equipment 1 with respect to signal transmission to a user equipment 2 at downlink subframe 0, the user equipment 1 transmits a signal (or data) to the user equipment 2 at subframe 4, and the user equipment 2 that has received the signal tries decoding the received signal (or data) and transmits A/N information indicating success or failure of the decoding to the base station at uplink subframe 8. Meanwhile, the base station may transmit related scheduling information to the user equipment 2, so that the user equipment 2 may receive the signal of the user equipment 1.

Based on the A/N signal transmitted from the user equipment 2 at uplink subframe 8, the base station may perform scheduling (UL grant) for the user equipment 1 at downlink subframe 12 with respect to retransmission of the corresponding signal (or data) or new transmission at the corresponding HARQ process. At this time, the scheduling information transmitted from the base station to the user equipment 1 may include indication information (for example, ACK/NACK information of the user equipment 2) as to whether retransmission is performed. If the scheduling information transmitted from the base station includes retransmission indication information (for example, NACK information of the user equipment 1), the user equipment 1 may retransmit the same signal (or the same data) as the signal (or data) transmitted at subframe 4 to the user equipment 2 at subframe 16 in accordance with the same format or new format. Afterwards, if the user equipment 2 receives the retransmitted signal (or data), the user equipment 2 again tries decoding by combining the retransmitted signal with the signal (or data) of which decoding is failed and then stored in the soft buffer in various manners. If decoding is successfully performed, the user equipment 2 transmits ACK signal to the base station, and if decoding is failed, the user equipment 2 transmits NACK signal to the base station. On the other hand, if the scheduling information transmitted from the base station includes new transmission indication information (for example, ACK information of the user equipment 2), the user equipment 1 senses that data transmission to the user equipment 2 has been successfully performed, stops HARQ retransmission of the corresponding signal (or data) and transmits new signal (or data) to the user equipment 2 at subframe 16 in accordance with the scheduling information of the base station.

Accordingly, according to such HARQ operation, a signal retransmission cycle in UE-to-UE communication is 12 ms (that is, initial transmission at subframe 4, retransmission at subframe 16, . . . ).

In the meantime, downlink HARQ process also exists between the base station and the user equipment. For example, the base station may transmit uplink grant to the user equipment 1 at subframe 0 and at the same time perform downlink scheduling for the user equipment 1 or the user equipment 2. The downlink-scheduled user equipments receive downlink data at the scheduled corresponding subframe, and transmits success or failure in reception (ACK/NACK) to the base station after a certain decoding time passes. Generally, the decoding time in the LTE-A system is 4 ms, and thus the user equipment which is downlink-scheduled at subframe 0 receives PDSCH at subframe 0 and transmits ACK or NACK (A/N) to the base station at subframe 4.

However, if UE-to-UE communication is scheduled by the base station, such downlink HARQ timeline or timing is not maintained. This is because that the transmitting user equipment and the receiving user equipment, which perform UE-to-UE communication, may not perform uplink transmission to the base station at the uplink subframe at which UE-to-UE communication is scheduled. Accordingly, a problem may occur in that A/N for downlink transmission linked to the corresponding uplink subframe may not be transmitted at the time scheduled between the base station and the user equipment. For example, in view of the transmitting user equipment, since the transmitting user equipment should transmit data to the receiving user equipment at the uplink subframe at which UE-to-UE communication is scheduled, by using a transmission power appropriate for UE-to-UE communication, there may be difficulty in A/N transmission to the base station that requires a power value different from that used for UE-to-UE communication. In view of the receiving user equipment, since the receiving user equipment should receive data from the transmitting user equipment, the receiving user equipment does not transmit A/N to the base station, and may not transmit A/N for PDSCH received from the base station at the uplink subframe at which A/N for UE-to-UE communication is transmitted to the base station. However, it is general that the base station does not perform downlink scheduling or cannot perform downlink scheduling at the subframe at which UE-to-UE communication is performed. Accordingly, in this case, A/N for UE-to-UE communication is only transmitted. This will be described with reference to FIG. 11.

Figure 11:
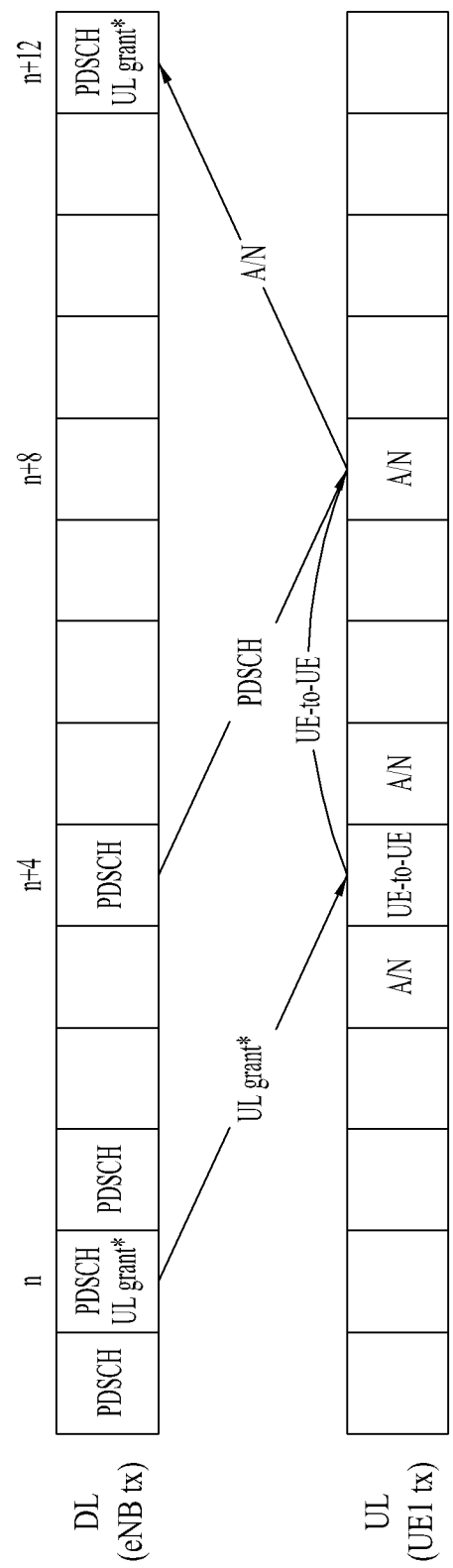
FIG. 11 is a diagram illustrating collision between data based on BS-to-UE communication and data based on UE-to-UE communication.

FIG. 11 is a diagram illustrating collision between data based on BS-to-UE communication and data based on UE-to-UE communication.

In FIG. 11, uplink grant corresponding to scheduling for UE-to-UE communication is referred to as UL grant* to be identified from uplink grant for BS-to-UE communication.

Referring to FIG. 11, the base station may perform downlink scheduling for the user equipment 1 at subframe n and at the same time transmit uplink grant to the user equipment 1. In this case, if the user equipment 1 receives PDSCH at subframe n in accordance with downlink scheduling information, the user equipment 1 should feed A/N for PDSCH back to the base station at subframe n+4. However, since the user equipment 1 performs UE-to-UE communication (that is, signal transmission to the user equipment 2) at the corresponding uplink subframe, the user equipment 1 cannot perform uplink communication to the base station, that is, uplink data and A/N transmission.

Likewise, if the user equipment 2 receives PDSCH from the base station at subframe n, the user equipment 2 should feed A/N for PDSCH back to the base station at subframe n+4. However, since the user equipment 2 performs UE-to-UE communication (that is, signal reception from the user equipment 1) at the corresponding uplink subframe while being operated in a reception mode, the user equipment 2 cannot perform uplink communication to the base station, that is, uplink data and A/N transmission. Also, similarly, even in case that the user equipment 2 receives PDSCH from the base station at subframe n+4, the user equipment 2 should feed A/N back to the base station at subframe n+8. However, since this A/N may collide with A/N for UE-to-UE data received from the user equipment 1 at subframe n+4, a problem occurs in that A/N feedback transmission to the base station cannot be performed.

As a simple method for solving the problem, there is a method for not allocating downlink data transmission at a subframe transmission timing that may cause a problem. In other words, in case of the example of FIG. 11, downlink data may not be transmitted to the user equipment 1 or the user equipment 2 at subframes n and n+4.

However, instead of this method, the present invention suggests a method for setting exceptional HARQ timeline or timing if UE-to-UE communication is scheduled in a cellular system. In particular, the present invention suggests a method for setting and applying a mapping rule for supporting group A/N feedback for reception of two or more data.

According to the present invention, if UE-to-UE communication is performed, the mapping rule of the existing FDD system may not be used. In other words, A/N transmission for a plurality of downlinks maybe required at one uplink, or a feedback operation of A/N corresponding to a downlink to which data is not transmitted may be required. The mapping rule may have various methods, and a linkage between each downlink transmission and uplink A/N for the downlink transmission may be configured. Accordingly, the existing mapping rule is maintained, and if A/N for random downlink transmission is linked to uplink subframe at which A/N transmission cannot be performed due to UE-to-UE communication, the corresponding A/N may be linked to another appropriate uplink subframe. At this time, another appropriate uplink subfrmae should exist after a minimum time for PDSCH decoding and A/N generation, and should be within the range that A/N delay is not too great. This mapping rule may be configured semi-statically through RRC signaling.

First of all, A/N transmission for downlink may be impossible due to data transmission and reception based on UE-to-UE communication, wherein A/N is transmitted from the base station. This will be described with reference to FIG. 12.

Figure 12:
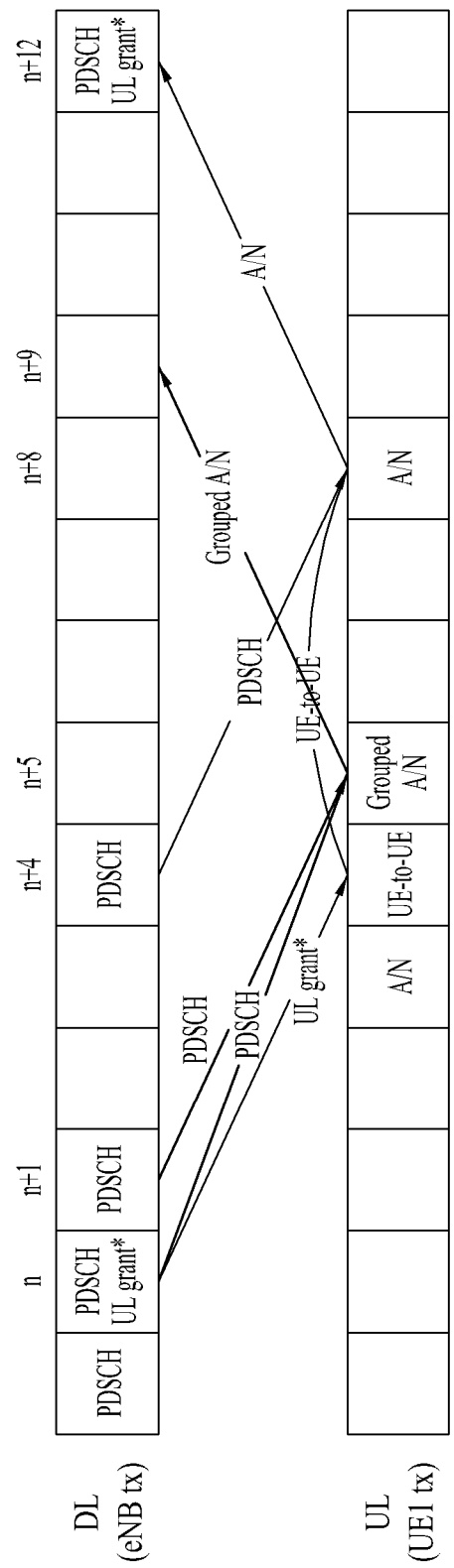
FIGS. 12 and 13 are diagrams illustrating an improved method for transmitting A/N in a cellular system that supports UE-to-UE communication according to one embodiment of the present invention.

FIG. 12 is a diagram illustrating an improved method for transmitting A/N signal in a cellular system that supports UE-to-UE communication according to one embodiment of the present invention.

FIG. 12 illustrates group A/N feedback operation for a plurality of downlink signals transmitted from the base station under the status of FIG. 11.

Referring to FIG. 12, the downlink to which A/N signal cannot be transmitted due to UE-to-UE communication may be configured to perform A/N feedback at the uplink subframe linked to the latest downlink following the corresponding downlink. In this case, group A/N signals corresponding to two downlink subframes are transmitted at the corresponding uplink subframe. In case of FIG. 12, A/N signals for PDSCH, which are transmitted at downlink subframe n+1 and downlink subframe n, are transmitted together at uplink subframe n+5. Although the A/N signal for the downlink subframe n should be transmitted at the uplink subframe n+4, since UE-to-UE communication scheduled at the downlink subframe n is performed at the subframe n+4, the A/N signal for the downlink subframe n may be transmitted together with the A/N signal for PDSCH, which is transmitted at the downlink subframe n+1.

Various methods for transmitting group A/N signals for a plurality of downlink transmissions (that is, group A/N transmission methods) may be provided. First of all, the user equipment may an A/N bundling method. In other words, the user equipment may transmit the result obtained by AND logic operation for A/N signals for a plurality of downlink transmissions to the base station as a final A/N. Also, the user equipment transmits the A/N signal from the PUCCH resource index linked to each downlink transmission in accordance with a decoding result of each downlink or selects one in accordance with A/N result and transmits the selected one by using a channel selection scheme (for example, PUCCH format 1b). In this case, the PUCCH resource index for use in A/N transmission may be given by a function of the first control channel element (CCE) (that is, scheduling information) of the PDCCH used to schedule downlink transmission related to the corresponding A/N. Also, a bit obtained by encoding (for example, joint coding) two or more A/N signals through one PUCCH (for example, PUCCH format 3/3A) may be transmitted using a given resource.

Also, if the user equipment 2 may receive data transmitted from the base station at the same subframe as the subframe at which data is received from the user equipment 1 (for example, if the user equipments having multiple antennas are divided for each antenna and linked to the base station and the other party user equipment), since the user equipment 2 should transmit A/N signals for two or more receptions at one subframe, a problem similar to the aforementioned problem may occur. In other words, a status may occur in that A/N signals for both downlink transmission transmitted from the base station and the signal transmitted from the other party user equipment of UE-to-UE communication should be transmitted. This will be described with reference to FIG. 13.

Figure 13:
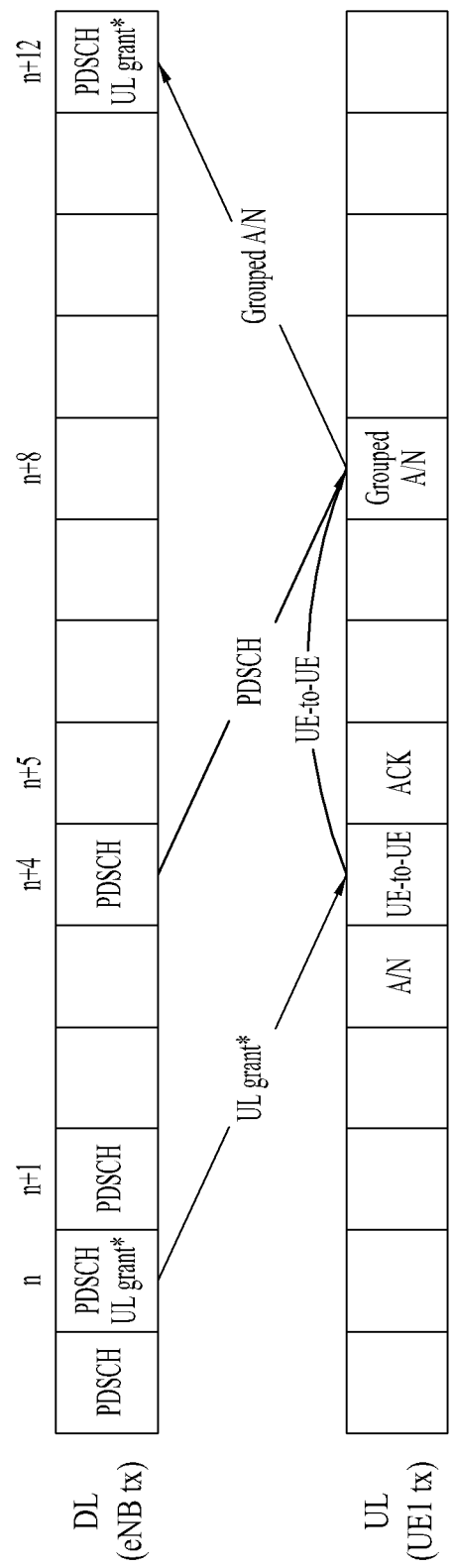

FIG. 13 is a diagram illustrating an improved method for transmitting A/N signal in a cellular system that supports UE-to-UE communication according to one embodiment of the present invention.

FIG. 13 illustrates group A/N feedback operation for the downlink signal transmitted from the base station and the signal transmitted from the other party user equipment based on UE-to-UE communication under the status of FIG. 11.

Referring to FIG. 13, the feedback timing of the aforementioned group A/N may correspond to A/N timing of subframe n+8. In other words, if the user equipment 2 receives downlink scheduling from the base station at subframe n+4 and receives the signal from the user equipment 1 at the same subframe, A/N for signals received from the base station and the user equipment should be transmitted together at the subframe n+8. In this case, as described above, A/N signal for UE-to-UE communication and A/N signal for the PDSCH received from the base station may be grouped and transmitted together at A/N transmission timing of the PDSCH, that is, the subframe n+8. At this time, since the transmitted group A/N signals include A/N information on UE-to-UE communication differently from the example of FIG. 12, the group A/N signals affect uplink grant for UE-to-UE communication without being defined for downlink retransmission only corresponding to a case where data decoding of UE-to-UE communication is failed.

At this time, various methods (that is, group A/N transmission methods) for transmitting group A/N signals for UE-to-UE communication and BS-to-UE communication may be provided. First of all, A/N resource for UE-to-UE communication and A/N resource for BS-to-UE may be allocated separately. In this way, if the A/N resources are allocated exclusively, A/N signals for UE-to-UE communication and BS-to-UE communication may be transmitted at the same time. For example, although PUCCH resource is used for BS-to-UE communication, if another method such as another format or piggybacking (for example, a specific resource is newly allocated for UE-to-UE communication) is used as A/N resource for UE-to-UE communication instead of PUCCH resource, a compression scheme such as AND logic operation may not be used. In this case, PUCCH resource index for use in A/N transmission based on BS-to-UE communication may be given by a function of the first control channel element (CCE) of the PDCCH used to schedule downlink transmission related to the corresponding A/N.

A separate PUCCH resource (time-frequency resource or resource index) may be allocated for UE-to-UE communication and BS-to-UE communication. At this time, as a method for allocating PUCCH resource, the aforementioned method may be used for A/N for BS-to-UE communication, and A/N resource (time-frequency resource or PUCCH index) for UE-to-UE communication may be allocated semi-statically using an upper layer signal to be exclusive to the existing A/N resource. Alternatively, each of the A/N resource for UE-to-UE communication and the existing A/N resource may be allocated semi-statically.

As described above, a plurality of A/N signals for BS-to-UE communication may be transmitted to the base station as group A/N signals, and A/N signal for BS-to-UE communication and A/N signal for UE-to-UE communication may be transmitted to the base station as group A/N signals. In order to support such group A/N signals, the user equipment should identify a case where A/N signals to be transmitted to the base station cause a problem (that is, collision occurs between a plurality of A/N signals), and should know timing for transmitting group A/N signals. Also, as described above, since various methods for transmitting group A/N signals may be provided, the user equipment should know how to transmit the group A/N signals. Accordingly, whether group A/N signals are be transmitted and a method for transmitting group A/N signals may be configured as follows.

1) First of all, the base station may transmits information as to whether group A/N signals are used at each subframe, a mapping rule, and information on a method for transmitting group A/N signals to the user equipment by using an upper layer signal (for example, RRC signaling). In this case, the mapping rule means a linkage between downlink transmission and an uplink to which A/N signal is transmitted. In other words, the mapping rule means a linkage between a downlink subframe at which one or more downlink transmissions are performed and an uplink subframe at which A/N information based on the corresponding downlink transmission is transmitted. For example, downlink transmission for which A/N cannot be transmitted due to UE-to-UE communication may be designated to perform A/N feedback at the uplink subframe linked to the latest downlink transmission following the corresponding downlink transmission.

For example, in the example of FIG. 12, the base station may command the user equipment 1 to use group A/N, command the user equipment 1 to feed A/N signals for the downlink subframes n and n+1 back at uplink subframe n+5 through mapping rule information, and may command the user equipment 1 to use a bundling method as a method for transmitting group A/N signals. At this time, A/N resource at the corresponding uplink subframe may be the PUCCH resource (resource index) linked to the corresponding downlink transmission (for example, PDSCH at the subframe n+1), and its specific location (that is, time-frequency resource or PUCCH resource index) may be designated by the base station through the upper layer signal.

Also, in the example of FIG. 13, the base station may command the user equipment 2 to use group A/N, command the user equipment 1 to feed A/N signals for the downlink subframe n+4 and the subframe n+4 based on UE-to-UE communication back at uplink subframe n+8 through mapping rule information, and may command the user equipment 1 to perform feedback through a separate A/N resource as a method for transmitting group A/N signals. At this time, A/N resource based on BS-to-UE communication at the corresponding uplink subframe may be the PUCCH resource (resource index) linked to the corresponding downlink transmission (that is, downlink transmission at the subframe n+4). Another method such as another format or piggybacking may be used as A/N resource for UE-to-UE communication instead of PUCCH resource, and its specific location (that is, time-frequency resource or PUCCH resource index) may be designated by the base station through the upper layer signal.

Also, when a specific event occurs, for example, when scheduling for UE-to-UE communication occurs, or when UE-to-UE communication may be configured to be granted at a specific period, in A/N timing previously scheduled between the base station and the user equipment or A/N timing set from the base station, a method for using corresponding timing may be provided.

2) If the user equipment receives scheduling for UE-to-UE communication, that is, downlink control information (uplink grant (transmitting user equipment) for UE-to-UE communication or downlink scheduling information (receiving user equipment)) on UE-to-UE communication, since A/N transmission is not possible at the subframe at which corresponding UE-to-UE communication, it may be regarded that group A/N signals are transmitted at another subframe location scheduled previously or set by the base station. For example, A/N signal which is not transmitted at the subframe at which UE-to-UE communication is performed may be transmitted using group A/N signals at next subframe. In the same manner as the example of FIG. 12, since A/N transmission is not possible at the subframe n+4, the user equipment 1 may transmit group A/N signals at next subframe, which is scheduled previously with the base station or set by the base station, that is, subframe n+5. The base station may regard that group A/N signals transmitted at the subframe n+5 are A/N information on the downlink subframes n and n+1. At this time, it is not required that the location where the group A/N signals are transmitted should be next subframe, and a subframe of a specific location may be designated by timing which is previously determined. For example, downlink transmission for which A/N cannot be transmitted due to UE-to-UE communication may be designated to perform A/N feedback at the uplink subframe linked to the latest downlink transmission following the corresponding downlink transmission.

3) As another method, if UE-to-UE communication is enabled, the user equipment may be configured to always transmit group A/N signals. For example, if UE-to-UE communication is configured to be enabled, the user equipment may be configured to transmit A/N signal, which will be transmitted at a previous uplink subframe, together with A/N signal, which will be transmitted at the corresponding uplink subframe, at all the uplink subframes. In this case, as shown in FIG. 12, A/N signal transmitted at the subframe n+5 is transmitted together with A/N signal transmitted at the previous subframe n+4. This operation may equally be applied to random n. Accordingly, if A/N transmission is not enabled at the uplink subframe n+4 due to UE-to-UE communication, this operation may be regarded as the same operation as that shown in FIG. 12. If there is no UE-to-UE communication at the uplink subframe n+4, A/N signal at the subframe n+4 is transmitted at the subframe n+4, and is repeated or omitted at next subframe n+5. In this case, the operation corresponding to the case where the A/N signal at the subframe n+4 is omitted at the subframe n+5 means that A/N signal at the subframe n+4 is DTX (which means there is no A/N transmission) at the subframe n+5, or may be configured at an always specific state (for example, always ACK). If the PDSCH corresponding to A/N signal which will be transmitted at the subframe n+4 does not exist, A/N signal at the subframe n+5 may be transmitted on the assumption that A/N signal at the subframe n+4 is DTX at the subframe n+5 or may be configured at an always specific state (for example, always ACK).

General Device to which the Present Invention May be Applied

Figure 14:
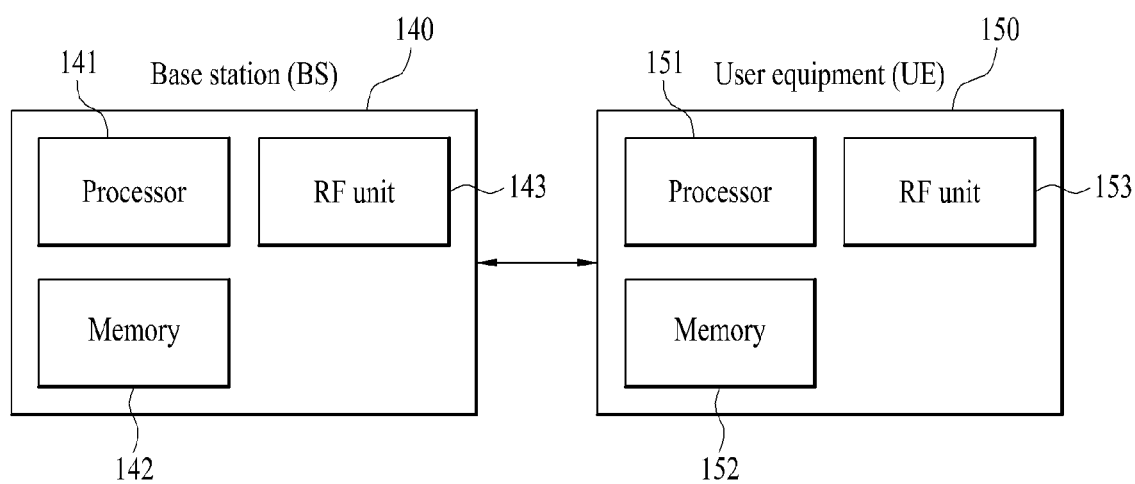
FIG. 14 is a block diagram illustrating a wireless communication device according to one embodiment of the present invention.

FIG. 14 is a block diagram illustrating a wireless communication device according to one embodiment of the present invention.

Referring to FIG. 14, the wireless communication system includes a base station 140 and a plurality of user equipments 150 located within the base station 140.

The base station 140 includes a processor 141, a memory 142, and a radio frequency (RF) unit 143. The processor 141 may be configured to implement functions, procedures and/or methods suggested in the present invention. Layers of a radio interface protocol may be implemented by the processor 141. The memory 142 is connected with the processor 141 and stores various kinds of information related to the operation of the processor 141. The RF unit 143 is connected with the processor 151 and transmits and/or receives a radio signal.

The user equipment 150 includes a processor 151, a memory 152, and a radio frequency (RF) unit 153. The processor 151 may be configured to implement functions, procedures and/or methods suggested in the present invention. Layers of a radio interface protocol may be implemented by the processor 151. The memory 152 is connected with the processor 151 and stores various kinds of information related to the operation of the processor 151. The RF unit 153 is connected with the processor 151 and transmits and/or receives a radio signal.

The memory 142, 152 may be located inside or outside the processor 141, 151, and may be connected with the processor 141, 151 by various means which are well known. Also, the base station 140 and/or the user equipment 150 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although various methods according to the present invention have been described based on the 3GPP LTE system, they may equally be applied to various wireless access systems in addition to the 3GPP LTE system.

The invention claimed is:

1. A method for transmitting an ACK/NACK (acknowledgement/negative-ACK) signal by a first user equipment (UE) to a base station (BS) in a wireless communication system supporting a direct communication between the first UE and another UE, the method comprising:
receiving, by the first UE from the BS, first data, wherein ACK/NACK information for the first data is configured to be transmitted in a first subframe;
receiving, by the first UE from the BS, second data, wherein ACK/NACK information for the second data is configured to be transmitted in a second subframe different from the first subframe;
when the direct communication between the first UE and the another UE is configured in the first subframe, transmitting, by the first UE to the BS, group ACK/NACK information for the first data and the second data in the second subframe; and
when the direct communication between the first UE and the another UE is not configured in the first subframe, transmitting, by the first UE to the BS, the ACK/NACK information for the first data in the first subframe.

2. The method according to claim 1, wherein the group ACK/NACK information includes the ACK/NACK information for the first data and the ACK/NACK information for the second data.

3. The method according to claim 2, wherein the group ACK/NACK information is transmitted by bundling the ACK/NACK information for the first data and the ACK/NACK information for the second data.

4. The method according to claim 1, wherein a resource for transmitting the ACK/NACK information for the first data is determined by a PUCCH (Physical Uplink Control Channel) resource index linked to scheduling information of the first data, and a resource for transmitting the ACK/NACK information for the second data is determined by a PUCCH resource index linked to scheduling information of the second data.

5. The method according to claim 1, wherein the ACK/NACK information for the first data and the ACK/NACK information for the second data are encoded together to generate the group ACK/NACK information and the group ACK/NACK information is transmitted through a single PUCCH.

6. The method according to claim 1, wherein a resource for transmitting the ACK/NACK information for the first data and a resource for transmitting the ACK/NACK information for the second data are allocated exclusively.

7. The method according to claim 1, wherein a resource for transmitting the group ACK/NACK information is determined by a PUCCH resource index linked to scheduling information of the second data.

8. The method according to claim 1, wherein the second subframe is an uplink subframe which firstly comes after the first subframe.

9. The method of claim 1, further comprising:
receiving, by the first UE from the second UE, third data; and
when transmission of ACK/NACK information for the third data is configured in the first subframe with transmission of the ACK/NACK information for the first data, the group ACK/NACK information further includes the ACK/NACK information for the third data.

10. A user equipment (UE) configured to transmit an ACK/NACK (acknowledgement/negative-ACK) signal to a base station (BS) in a wireless communication system supporting a direct communication between the UE and another UE, the user equipment comprising:
a radio frequency (RF) unit that transmits and receives a radio signal; and
a processor that:
receives first data from the BS, wherein ACK/NACK information for the first data is configured to be transmitted in a first subframe,
receive second data from the BS, wherein ACK/NACK information for the second data is configured to be transmitted in a second subframe different from the first subframe;
when the direct communication between the UE and the another UE is configured in the first subframe, transmits, to the BS, group ACK/NACK information for the first data and the second data in the second subframe, and
when the direct communication between the UE and the another UE is not configured in the first subframe, transmit, to the BS, the ACK/NACK information for the first data in the first subframe.

11. The user equipment according to claim 10, wherein the group ACK/NACK information includes the ACK/NACK information for the first data and the ACK/NACK information for the second data.

12. The user equipment according to claim 11, wherein the group ACK/NACK information is transmitted by bundling the ACK/NACK information for the first data and the ACK/NACK information for the second data.

13. The user equipment according to claim 11, wherein a resource for transmitting the group ACK/NACK information is determined by a PUCCH resource index linked to scheduling information of the second data.

14. The user equipment according to claim 10, wherein a resource for transmitting the ACK/NACK information for the first data is determined by a PUCCH (Physical Uplink Control Channel) resource index linked to scheduling information of the first data, and a resource for transmitting the ACK/NACK information for the second data is determined by a PUCCH resource index linked to scheduling information of the second data.

15. The user equipment according to claim 10, wherein the ACK/NACK information for the first data and the ACK/NACK information for the second data are encoded together to generate the group ACK/NACK information and the group ACK/NACK information is transmitted through a single PUCCH.

16. The user equipment according to claim 10, wherein a resource for transmitting the ACK/NACK information for the first data and a resource for transmitting the ACK/NACK information for the second data are allocated exclusively.

17. The user equipment according to claim 10, wherein the second subframe is an uplink subframe which firstly comes after the first subframe.

18. The user equipment of claim 10, wherein the processor further:

receives, from the another UE, third data; and when transmission of ACK/NACK information for the third data is configured in the first subframe with transmission of the ACK/NACK information for the first data, transmits, to the BS, group ACK/NACK information including the ACK/NACK information for the first data and the ACK/NACK information for the third data.

* * * * *